United States Patent [19]

Schmidt et al.

[11] Patent Number: 4,953,833
[45] Date of Patent: Sep. 4, 1990

[54] HYDRAULICALLY DAMPING ELASTIC BEARING

[75] Inventors: Kurt Schmidt, Heimersheim; Detlef Waloszyk, Titz-Rödingen, both of Fed. Rep. of Germany

[73] Assignee: Boge AG, Fitorf, Fed. Rep. of Germany

[21] Appl. No.: 395,018

[22] Filed: Aug. 17, 1989

[30] Foreign Application Priority Data

Aug. 17, 1988 [DE] Fed. Rep. of Germany ....... 3827905

[51] Int. Cl.$^5$ .............................................. F16F 13/00
[52] U.S. Cl. .............................. 267/140.1; 267/64.28; 267/141.2; 267/219
[58] Field of Search ............... 267/140.1, 140.2, 141.2, 267/219, 220, 141.3, 141.4, 141.5, 141.6, 141.7, 64.28; 248/562, 636; 180/300, 312, 902; 188/269, 322.21

[56] References Cited

U.S. PATENT DOCUMENTS

| | | | |
|---|---|---|---|
| 3,642,268 | 2/1972 | Hipsher | 267/140.1 X |
| 4,199,128 | 4/1980 | Van Den Boom et al. | 267/140.1 X |
| 4,215,842 | 8/1980 | Brenner et al. | 267/113 X |
| 4,610,438 | 9/1986 | Eberhard et al. | 267/220 |
| 4,645,189 | 2/1987 | Quast | 267/113 X |
| 4,660,813 | 4/1987 | Reuter | 267/140.1 |
| 4,690,389 | 11/1987 | West | 267/140.1 |
| 4,693,456 | 9/1987 | Kanda | 267/140.1 |
| 4,697,793 | 10/1987 | Reuter et al. | 267/219 X |
| 4,702,346 | 10/1987 | Uno et al. | 267/140.1 X |
| 4,717,111 | 1/1988 | Saito | 267/140.1 X |
| 4,742,998 | 5/1988 | Schubert | 267/136 |
| 4,768,760 | 9/1988 | Le Fol | 267/140.1 |
| 4,781,362 | 11/1988 | Reuter et al. | 267/219 |
| 4,796,875 | 1/1989 | Mertens et al. | 267/64.28 X |
| 4,817,925 | 4/1989 | Sprang et al. | 267/219 X |
| 4,817,926 | 4/1989 | Schwerdt | 267/219 X |
| 4,840,359 | 6/1989 | Hamaekers et al. | 267/140.2 X |
| 4,856,764 | 8/1989 | Kanda | 267/140.1 |

FOREIGN PATENT DOCUMENTS

| | | | |
|---|---|---|---|
| 0234966 | 9/1987 | European Pat. Off. | |
| 1942853 | 3/1970 | Fed. Rep. of Germany | |
| 2841505 | 3/1980 | Fed. Rep. of Germany | |
| 3617787 | 11/1986 | Fed. Rep. of Germany | |
| 3631620 | 3/1987 | Fed. Rep. of Germany | |
| 3605305 | 8/1987 | Fed. Rep. of Germany | |
| 8714241.4 | 1/1988 | Fed. Rep. of Germany | |
| 3810309 | 10/1989 | Fed. Rep. of Germany | |
| 56-164242 | 12/1981 | Japan | 267/140.1 |
| 0203242 | 11/1983 | Japan | 267/140.1 |
| 0157849 | 7/1986 | Japan | 267/140.1 |
| 0118131 | 5/1987 | Japan | 267/140.1 |
| 2192968 | 1/1988 | United Kingdom | 267/219 |

*Primary Examiner*—Douglas C. Butler
*Attorney, Agent, or Firm*—Nils H. Ljungman

[57] ABSTRACT

A hydraulically damping elastic bearing comprises an inner tube, an outer tube concentric or eccentric in relation to and located at some distance from the inner tube. An elastic part is inserted between them to include at least two chambers filled with damping medium. The two chambers are connected to one another by a flow connnection. To prevent cavitation and/or the formation of gas bubbles in the damping fluid, and to prevent a possible underpressure in a chamber when the chambers are not symmetrical, the damping medium is pressurized with an overpressure which is above atmospheric pressure.

13 Claims, 3 Drawing Sheets

DAMPING FLUID UNDER PRESSURE

DAMPING FLUID UNDER PRESSURE

HYDRAULICALLY DAMPING ELASTIC BEARING

BACKGROUND OF THE INVENTION

1. Field of the Invention:

This invention relates to a hydraulically damping elastic bearing comprising an inner tube and an outer tube, which is concentric or eccentric in relation to it and located at some distance from it, with an elastic part inserted between them. There are at least two chambers generally defined within the elastic part which are filled with damping medium and connected to one another by means of a flow connection. The invention includes means for reducing cavitation of, or bubble formation within, the damping medium.

2. Description of the Prior Art:

The prior art includes elastic bearings (e.g. German Patent No. 28 41 505), which comprise an inner tube, an outer tube concentric or eccentric in relation to it and located at some distance from it and an elastic part inserted between them, whereby there are chambers filled with damping fluid in the elastic part and hydraulically connected with one another. In such elastic bearings, practical experience has shown that under certain operating conditions, there can be a reduced damping between two chambers connected with one another. It has been found, for example, that cavitation can occur in the depressurized chambers. Moreover, the formation of gas bubbles has been found when the damping fluid is heated during long-term operation.

If the chambers must be of different sizes for design reasons, underpressures in the smaller chamber can occur during operation of the elastic bearing, as a function of the deformation of the overall part.

Such elastic bearings are used particularly in motor vehicles and, principally, in wheel suspensions, steering linkages, tie rod connections, and the like. German Laid Open Patent Appln. No. 36 05 305 A1 and German Utility Model No. G 87 14 241.4 disclose two such bearings by way of example.

OBJECT OF THE INVENTION

The object of the invention is to reduce any possible cavitation and/or the formation of gas bubbles in the damping fluid which may occur in an elastic bearing, and to reduce an underpressure in the chambers.

SUMMARY OF THE INVENTION

This object is achieved according to the invention in that the damping fluid in the chambers is pressurized with an overpressure.

An advantage here is that by preventing cavitation in the depressurized chamber, the damping action is retained. The formation of gas bubbles can also be reduced, and a static underpressure can be avoided when the chambers are deformed to differing degrees. The above-mentioned advantages prevent a reduction in the damping action during operation of the elastic bearing.

In accordance with one embodiment of the invention, the damping medium is injected with an overpressure. The damping medium may be introduced by means of a filling opening, which is closed after the application of the overpressure to the damping medium.

In an additional embodiment of the invention, after the installation of the elastic part and the filling of the chambers with damping medium, the diameter of the outer tube is calibrated or reduced to produce an overpressure.

An advantage with these embodiments is that at least one of the chambers is always pressurized with an overpressure to eliminate the above-mentioned disadvantages.

To satisfy the objects of the invention, a preferred embodiment includes a hydraulically damping elastic bearing. The elastic bearing includes an inner tube and an outer tube disposed about and separated from the inner tube. At least one elastic member is provided between the inner tube and the outer tube. At least one of the inner tube, the outer tube and the elastic member defines at least two chambers within the bearing. There is included at least one throttle passage between the two chambers. A damping medium in the two chambers and the throttle passage therebetween is at a predetermined elevated pressure above atmospheric pressure. The damping medium has at least one predetermined vaporization pressure. The predetermined elevated pressure is greater that the predetermined vaporization pressure. The two chambers, the throttle passage and the damping medium are configured to minimize formation of, at least one of gas bubbles and cavitation of the damping medium during use of the elastic bearing.

The invention includes a method of forming a hydraulically damping elastic bearing comprising the steps of: providing an inner tube; positioning an outer tube about and separated from the inner tube; forming at least one elastic member between the inner tube and the outer tube; forming at least two chambers and at least one throttle passage between the two chambers within the bearing during the forming of the elastic member; and injecting a damping medium having at least one predetermined vaporization pressure into the two chambers and the throttle passage therebetween at a predetermined elevated pressure which is greater than atmospheric pressure and greater than the predetermined vaporization pressure.

Additionally, the invention can include a method of forming a hydraulically damping elastic bearing comprising the steps of: providing an inner tube; positioning an outer tube about and separated from the inner tube; forming at least one elastic member between the inner tube and the outer tube; forming at least two chambers and at least one throttle passage between the two chambers within the bearing during the forming of the elastic member; injecting a damping medium having at least one predetermined vaporization pressure in the two chambers and the throttle passage therebetween at substantially atmospheric pressure; and reducing at least one dimension of the outer tube to cause a reduction of a volume of at least one of the two chambers to cause the damping medium to be elevated to a predetermined elevated pressure which is above the atmospheric pressure and above the predetermined vaporization pressure.

BRIEF DESCRIPTION OF THE DRAWINGS

Preferred embodiments of the invention are schematically illustrated in the accompanying drawings.

DESCRIPTION OF THE PREFERRED EMBODIMENT

Figure 1:
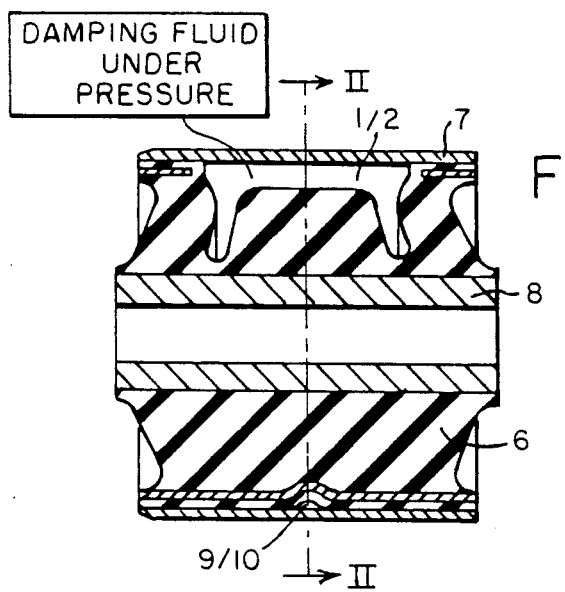
FIG. 1 shows a preferred hydraulically damping elastic bearing in cross section (as generally seen along Line I—I of FIG. 2) with two chambers filled with damping medium.

The hydraulically damping elastic bearing illustrated in FIG. 1 comprises essentially the inner tube 8 and an outer tube 7 located concentric to it and at some distance from it. An elastic part 6 is disposed between the inner tube 8 and outer tube 7 and is preferably made of rubber or a similar synthetic elastomer material. The elastic part 6 has chambers 1, 2 filled with damping medium. The damping medium in the chambers 1, 2 is pressurized with an overpressure which is above atmospheric pressure.

The preferred damping medium or fluid, which is primarily used, is a mixture of water and anti-freeze, e.g. glycol, although other similar fluids could be employed. The overpressure of the damping medium establishes an internal pressure which is a function of the operating characteristics of the particular bearing and its use.

Figure 2:
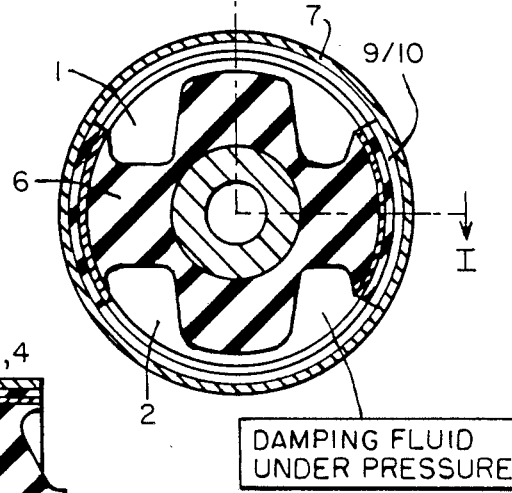
FIG. 2 is a sectional view of the elastic bearing of FIG. 1 as seen along Line II—II.

As seen in FIG. 2, the chambers 1 and 2 are connected by means of one or two flow connections 9 and 10 respectively. Depending on the forces applied to the bearing, the increased pressure in one of the chambers 1, 2 and the decreased pressure caused by an "expansion" of the other chambers 2, 1 will produce a flow through the connections 9 and 10. It is the purpose of the invention to provide a sufficient overpressure in the damping medium above atmospheric pressure in a normal position of the bearing to insure proper flow of the medium during these extreme conditions which can produce a decrease pressure in one of the chambers. Even with a condition of decreased pressure, the preferred initial overpressure or elevated pressure of the medium would reduce or prevent the formation of bubbles or possible cavitation as the medium flows through the flow connections 9, 10 in an effort to equalize the pressure in the chambers 1, 2. The preferred elevated pressure or initial overpressure would clearly be a function of the vaporization characteristics of the particular damping medium, the size of the chambers, the size of the connection lines and the maximum designed forces on the bearing. It should be clear to those skilled in the art of damping bearings that the particular elevated pressure is most reasonably obtained by testing and experimentation of proposed bearing models under controlled conditions. The preferred elevated pressure is intended to insure that the damping medium in the chambers and in the connecting throttle passages remains substantially above the vaporization pressure to minimize any formation of gas bubbles and/or cavitation of the damping medium.

Because the preferred hydraulically damping elastic bearing may be used in such components as wheel suspension, steering linkages, tie rods connections, or the like, the particular size of the elastic bearing would significantly depend upon the use. Accordingly, lengths of approximately 20 mm to 200 mm and diameters of 100 mm to 200 mm are customary although larger or smaller dimensions may also be possible.

It should also be noted that the diameter or cross-sectional dimensions of the passages 9 and 10 are selected so that there is a throttling of the damping medium or fluid flowing therethrough. The throttling is determined by the frequency to be dampened and is again primarily selected to be consistent with the particular purpose and use of the elastic bearing. Again, it is not uncommon for experimentation and testing of proposed models of particular elastic bearings to be conducted prior to a selection of a final design including the properly dimensioned passages 9 and 10.

Figure 3:
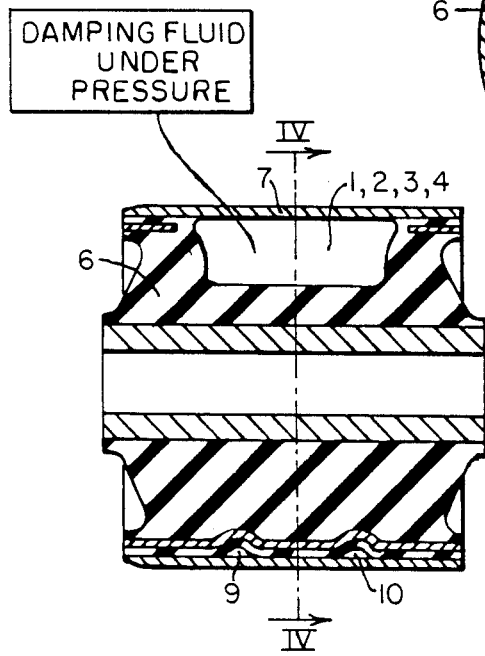
FIG. 3 shows another embodiment of an elastic bearing in cross section (as generally seen along Line III—III of FIG. 4) in which there are a total of four chambers.
Figure 4:
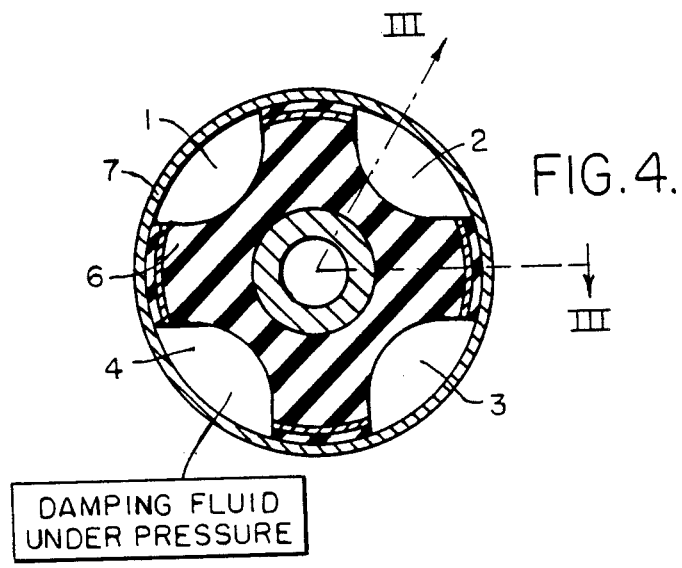
FIG. 4 is a sectional view of the embodiment of FIG. 3 as seen along Line IV—IV.

FIGS. 3 and 4 show another embodiment with the chambers 1, 2, 3, 4 filled with the damping medium. Here again, a flow connection 9 or 10 connects the chambers with one another.

Figure 5:
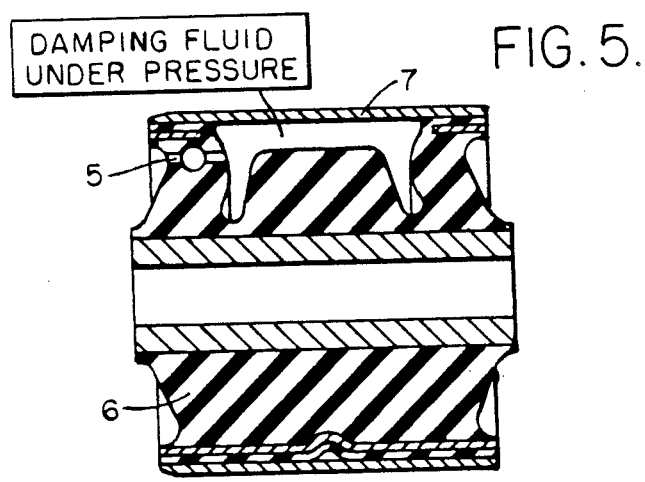
FIG. 5 shows, in a manner which is similar to the view of FIG. 1, an elastic bearing in cross section, in which there is a filling opening.

The embodiment illustrated in FIG. 5 has a filling opening 5 in the elastic part 6 which is used to introduce the damping fluid into the chamber 1 at the preferred elevated pressure above atmospheric pressure and which is closed after the application of the overpressure to the damping medium.

In another alternative embodiment of the elastic bearing, the outside diameter of the elastic bearing can be calibrated or reduced after assembly and/or installation. During the calibrated or reduction, the outer tube 7 may be reduced in size by approximately 0.5 mm to 1 mm in order to establish the proper dimensions of the outside diameter of the outer tube. The initial outside diameter may be reduced by as little as about 1 percent or as much as about 5 percent. With the elastic bearing having been assembled, the volume of the chambers, which are initially filled with the damping medium at substantially atmospheric pressure, is thereby reduced. Accordingly, the pressures in the chambers are increased to the desired elevated or overpressure for operation of the elastic bearing as discussed hereinabove.

The reduction may be provided by a forming or reducing mandrel or the like. It would even be possible to reduce a limited section or portion of the outer tube to provide an indentation or groove in only one of the chambers 1, 2, for example. Any appropriate reduction of at least one dimension of the outer tube could effectively reduce the volume of at least one of the chambers 1, 2 to increase the pressure of the damping medium throughout the bearing.

Figure 6:
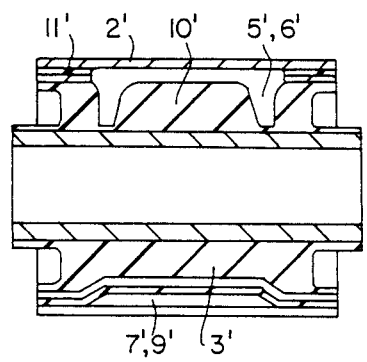
FIG. 6 is a sectional side view of an alternative hydraulic damping elastic or rubber bearing showing one of the chambers and one sector including a connecting passage and including various features of the invention.

The preferred hydraulic damping elastic or rubber bearing, as shown in FIG. 6, comprises an internal tube 1', an intermediate tube 11' located at some distance from the internal tube 1', and an elastic or rubber part 3' inserted therebetween. The intermediate tube, which is similar to those shown in FIGS. 1 through 5, is primarily for reinforcement of the part 3' and can include portions which are either concentrically or eccentrically disposed with respect to the internal tube 1'. Basically, the internal tube 1' and an external tube 3', which is disposed around but radially separated from the internal tube 1', are separated by the elastic or rubber part 3' therebetween. In the elastic or rubber part 3', there are again chambers 5', 6' in the form of cavities which are filled with damping medium and hydraulically connected to one another by means of a throttle passage 4'. The damping medium would be similar to that discussed hereinabove and may again be maintained at an elevated pressure above atmospheric pressure to minimize any cavitation or formation of bubbles.

The preferred throttle passage 4' is basically formed as a recess in the elastic or rubber part 3' with the interior wall of the external tube 3' defining the remainder thereof. The throttle passage 4' is preferably located adjacent a portion of the intermediate tube 11'. As a result, the reinforcement provided by the intermediate tube 11' during relative movement of the interal tube 1' and the external tube 3' will prevent the undesired collapse or closure of the throttle passage 4'.

The chambers are partially defined by the part 3' and then closed on the outside by means of an external tube 2' to define the remainder thereof. The cylindrical internal tube 1' and the intermediate tube 11' are preferably attached to a part 3' of rubber by vulcanization. The chambers 5', 6' are cavities formed in the outer circumference of the elastic or rubber part 3' to include in each chamber which is similar to those shown in FIGS. 1 through 5 a projecting rubber stop cam 10'. The stop cams 10' are used to provide a defined spring characteristics when there is a load in either direction, as indicated by the arrows, after the external tube 2' comes in contact with the stop cam 10'.

In the lower portion of FIG. 6, a preferred valve 7' is shown in the form of an elastic or rubber lip 9'. The elastic or rubber lip 9' is preferably located in a passage 8', which also connects the chambers 5' and 6', and tends to close the passage 8' between the two chambers 5' and 6'. When oscillations having large amplitudes occur, the increased internal pressure in one chamber 5', 6' deflects the elastic or rubber lip 9' and opens the passage 8' as a bypass for the throttle passage 4'. According to the present invention, the medium may be at the preferred elevated pressure and would again tend to minimize or prevent cavitation or formation of bubbles in the passage 8' and around the valve 7'.

Figure 7:
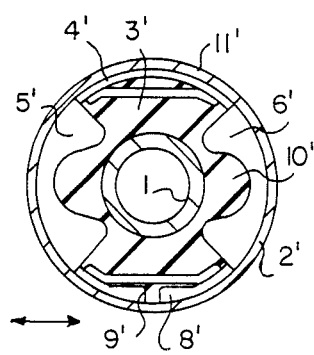
FIG. 7 is a cross-sectional end view of the bearing illustrated in FIG. 6 showing the relationship of the chambers and the passages.

FIG. 7 shows, in cross section, the internal tube 1', the intermediate tube 11' with the interposed elastic or rubber part 3', and the external tube 2'. The chambers 5' and 6' are connected to one another by the throttle passage 4'. The flow cross section of the passage 8' is preferably larger than the flow cross section of the throttle passage 4'. The rubber lip 9' acts as a valve 7' and tending to close the passage 8'. However, when there is an increased pressure in one of the two chambers 5', 6', the elastic or rubber lip 9' is laterally deflected to allow the damping medium, which may be at an initially elevated pressure, to flow from one chamber to the other.

Figure 8:
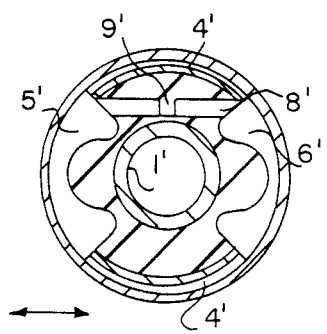
FIG. 8 is a cross-sectional end view of another alternative bearing with different valves and passages including various features of the invention.

FIG. 8 illustrates another embodiment in which the chambers 5' and 6' are connected to one another by two throttle passages 4'. The passage 8' of the embodiment is formed in the vicinity of the internal tube 1', so that the elastic or rubber lip 9' tends to cooperate or work with an external wall of the internal tube 1'.

the two chambers 5 and 6' are connected to one another by two throttle passages 4'. In this embodiment, there are also a pair of passages 8a' and 8b', one for each direction of flow of the damping medium. Each of the passages 8a', 8b' respectively includes a mechanical valve 7a' and 7b' including a ball and corresponding spiral spring which serve as the valve. Oscillations with large amplitudes are absorbed by the corresponding passage 8a' or 8b', depending on the direction of the pressure.

Clearly, any of the embodiments shown in FIGS. 6 through 9 could be provided a filling opening similar to that shown in FIG. 5.

Alternatively, the proper design of the intermediate tube 11' and the external tube 2' would enable them to be reduced to produce the preferred elevated pressure of the damping medium. Accordingly, the medium could again be injected into the chambers at atmospheric pressure for subsequent increase to the preferred elevated pressure by the reduction, with a forming mandrel or the like, of the external tube 2' and the intermediate tube 11'.

Hydraulic damping bearings are disclosed in German Patent Publication Published for Opposition Purposes No. 19 42 853, German Laid Open Patent Appln. No. 36 17 787, German Laid Open Patent Appln. No. 36 31 620, European Laid Open Patent Appln. No. 234,966 and U.S. Pat. No. 4,690,389. These patents and patent applications are incorporated herein by reference as if the entire contents thereof were fully set forth herein.

In summary, a preferred hydraulically damping elastic bearing comprises an inner tube, an outer tube concentric or eccentric in relation to the inner tube and located at some distance from the inner tube, and an elastic part inserted between them. There are the two chambers in the bearing filled with damping medium with at least two chambers being connected to one another by means of a flow connection. The bearing is characterized by the fact that the damping medium is pressurized in the chambers 1, 2, 3, 4 with an overpressure.

In one preferred embodiment, the elastic bearing is characterized by the fact that the damping medium is injected with an overpressure. Such an elastic bearing may be characterized by the fact that the damping medium is introduced by means of a filling opening 5, which is closed after the overpressure is applied to the damping medium.

In another embodiment, the elastic bearing may be characterized by the fact that after the installation of the elastic part 6 and the filling of the chambers 1, 2, 3, 4 with damping medium, the diameter of the outer tube 7 is calibrated or otherwise reduced to produce an overpressure in the fluid or medium.

The invention as described hereinabove in the context of a preferred embodiment is not to be taken as limited to all of the provided details thereof, since modifications and variations thereof may be made without departing from the spirit and scope of the invention.

What is claimed is:

1. A hydraulically damping elastic bearing comprising:
   an inner tube;
   an outer tube disposed about and separated from said inner tube;
   an at least one elastic member between said inner tube and said outer tube;
   at least one of said inner tube, said outer tube and said at least one elastic member defining at least two chambers within said bearing;

throttle passage means between said at least two chambers;

a damping medium in said at least two chambers and said throttle passages means therebetween at a predetermined elevated pressure above atmospheric pressure;

said damping medium having at least one predetermined vaporization pressure; and said predetermined elevated pressure being greater than said at least one predetermined vaporization pressure;

said at least two chambers and said throttle passage means being configured to substantially maintain said predetermined elevated pressure of said damping medium, such that, said at least two chambers, said throttle passage means, and said damping medium comprising means for minimizing formation of at least one of:

gas bubbles and cavitation of said damping medium during use of said elastic bearing.

2. The elastic baring according to claim 1, wherein said damping medium remains substantially above said predetermined vaporization pressure within at least some of said at least two chambers and said throttle passage means therebetween during said use of said elastic bearing.

3. The elastic bearing according to claim 1, wherein said predetermined elevated pressure of said damping medium above the atmospheric pressure is provided when said damping medium is introduced to said at least two chambers and said throttle passage means therebetween during assembly of said elastic bearing.

4. The elastic bearing according to claim 3, further including a filling means in said at least one elastic member for introduction of said damping medium to said at least two chambers and said throttle passage means at said predetermined elevated pressure.

5. The elastic bearing according to claim 4, wherein said filling means is located in said at least one elastic member between an end of said bearing and at least one of said at least two chambers.

6. The elastic bearing according to claim 1, wherein said throttle passage means includes at least one throttle passage and at least one additional passage having valve means therein.

7. The elastic bearing according to claim 6, wherein said predetermined elevated pressure of said damping medium is for said minimizing said formation of said at least one of gas bubbles and cavitation around said valve means.

8. The elastic bearing according to claim 1, wherein said at least one elastic member includes an intermediate tube for reinforcement of said at least one elastic member.

9. The elastic bearing according to claim 1, wherein said at least one elastic member includes stop cam means extending into at least one said of two chambers to minimize displacement of said inner tube with respect to said outer tube.

10. A method of forming a hydraulically damping elastic bearing, said method comprising the steps of:

providing an inner tube;

positioning an outer tube about and separated from said inner tube;

forming at least one elastic member between said inner tube and said outer tube;

forming at least two chambers and throttle passage means between said at least two chambers within said bearing during said forming of said elastic member: and injecting a damping medium having at least one predetermined vaporization pressure into said at least two chambers and said throttle passage means therebetween at a predetermined elevated pressure which is greater than atmospheric pressure and greater than said at least one predetermined vaporization pressure.

11. A method according to claim 10, wherein said forming said at least one elastic member includes providing a filling means in a wall of said at least one of said two chambers and said injecting is through said filling means.

12. A method of forming a hydraulically damping elastic bearing, said method comprising the steps of:

providing an inner tube;

positioning an outer tube about and separated from said inner tube;

forming at least one elastic member between said inner tube and said outer tube:

forming at least two chambers and throttle passage means between said at least two chambers within said bearing during said forming of said elastic member:

injecting a damping medium having at least one predetermined vaporization pressure in said at least two chambers and said throttle passage means therebetween at substantially atmospheric pressure; and reducing at least one dimension of said outer tube to cause a reduction of a volume of at least one of said at least two chambers to cause the damping medium to be elevated to a predetermined elevated pressure which is above the atmospheric pressure and above said predetermined vaporization pressure.

13. A method according claim 12, wherein said forming said at least one elastic member includes at least partially encasing an intermediate tube disposed between said inner tube and said outer tube for reinforcing said at least one elastic member and said reducing said at least one dimension of said outer tube includes correspondingly reducing at least one dimension of said intermediate tube.

* * * * *

UNITED STATES PATENT AND TRADEMARK OFFICE
CERTIFICATE OF CORRECTION

PATENT NO. : 4,953,833

DATED : September 4, 1990

INVENTOR(S) : Kurt SCHMIDT and Detlef WALOSZYK

Figure 9:
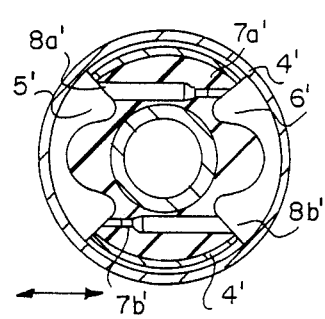
FIG. 9 is a cross-sectional end view of yet another alternative bearing with different valves and passages including various features of the invention.

It is certified that error appears in the above-identified patent and that said Letters Patent is hereby corrected as shown below:

ON TITLE PAGE:
    In the Assignee: Item [73] change "Fitorf" to --Eitorf--.
    In column 2, line 21, change "that" to --than--.
    In column 2, line 23, after 'of' delete ".".
    In column 5, line 66, please insert before 'the' --Figure 9 illustrates still another embodiment of an elastic or rubber bearing, in which--.
    In column 5, line 66, delete "5" and insert --5'--.

Signed and Sealed this

Thirty-first Day of December, 1991

Attest:

HARRY F. MANBECK, JR.

Attesting Officer      Commissioner of Patents and Trademarks